United States Patent
Bechstein

(10) Patent No.: US 10,203,254 B2
(45) Date of Patent: Feb. 12, 2019

(54) STRAIN SENSOR WITH THERMALLY CONDUCTIVE ELEMENT

(71) Applicant: Apple Inc., Cupertino, CA (US)

(72) Inventor: Daniel J. B. Bechstein, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 15/640,473

(22) Filed: Jul. 1, 2017

(65) Prior Publication Data

US 2018/0073944 A1 Mar. 15, 2018

Related U.S. Application Data

(60) Provisional application No. 62/393,490, filed on Sep. 12, 2016.

(51) Int. Cl.
*G01L 1/22* (2006.01)

(52) U.S. Cl.
CPC .......... *G01L 1/2281* (2013.01); *G01L 1/2293* (2013.01)

(58) Field of Classification Search
CPC .............................. G01L 1/2281; G01L 1/2293
See application file for complete search history.

(56) References Cited

U.S. PATENT DOCUMENTS

| | | | | |
|---|---|---|---|---|
| 3,498,118 A | * | 3/1970 | Ruge | G01L 1/2268 338/3 |
| 5,129,266 A | * | 7/1992 | Brandt, Jr. | G01L 1/2206 73/862.623 |
| 7,044,006 B2 | | 5/2006 | Kouyama et al. | |
| 7,553,681 B2 | | 6/2009 | Raravikar et al. | |
| 2006/0253942 A1 | * | 11/2006 | Barrera | B82Y 15/00 73/661 |
| 2008/0156112 A1 | * | 7/2008 | Sakurai | G01L 1/2281 73/862.474 |
| 2011/0227178 A1 | * | 9/2011 | Kazama | G01B 7/16 257/417 |
| 2012/0293491 A1 | * | 11/2012 | Wang | G06F 3/044 345/419 |
| 2013/0082970 A1 | * | 4/2013 | Frey | G06F 3/0414 345/173 |
| 2016/0048266 A1 | * | 2/2016 | Smith | G06F 3/0418 345/174 |
| 2016/0103545 A1 | * | 4/2016 | Filiz | G01L 1/18 345/174 |

(Continued)

FOREIGN PATENT DOCUMENTS

WO WO 2013128643 A1 * 9/2013 ............ G01B 7/18

*Primary Examiner* — David Bolduc
(74) *Attorney, Agent, or Firm* — Brownstein Hyatt Farber Schreck, LLP

(57) ABSTRACT

Embodiments are directed to a strain sensor having a thermally conductive element and methods related to the use thereto. In one aspect, an embodiment includes a substrate. A first strain-sensitive element may be positioned on a first surface of the substrate and a second strain-sensitive element may be positioned on a second surface of the substrate. The embodiment may further include a thermally conductive post positioned within the substrate and extending beyond at least one of the first or second surfaces. The embodiment may further include a thermally conductive plate separated from the substrate and attached to the thermally conductive post.

20 Claims, 15 Drawing Sheets

(56) References Cited

U.S. PATENT DOCUMENTS

2016/0147353 A1     5/2016  Filiz et al.
2016/0377501 A1*   12/2016  Agarwal ................. G01L 25/00
                                                            73/1.15

* cited by examiner

STRAIN SENSOR WITH THERMALLY CONDUCTIVE ELEMENT

CROSS-REFERENCE TO RELATED APPLICATION

This application claims the benefit under 35 U.S.C. § 119(e) of U.S. Provisional Patent Application No. 62/393,490, filed Sep. 12, 2016, and entitled "Strain Sensor with Thermally Conductive Element," the contents of which are incorporated herein by reference as if fully disclosed herein.

FIELD

The described embodiments relate generally to strain sensors. More particularly, the present embodiments relate to strain sensors having a thermally conductive element.

BACKGROUND

Strain gauges or sensors are used to detect or measure strain on an object. Strain measurements may be affected by temperature and other environmental factors which tend to vary over time. Additionally, strain measured using a pair of strain gauges or strain sensors may be affected by temperature variations between the pair of sensors.

SUMMARY

Embodiments of the present invention are directed to a composite strain sensor having a thermally conductive element.

In a first aspect, the present disclosure includes a strain sensor. The strain sensor includes a substrate. The strain sensor further includes a first strain-sensitive element positioned on a first surface of the substrate. The strain sensor further includes a second strain-sensitive element positioned on a second surface of the substrate. The strain sensor further includes a thermally conductive post positioned within the substrate and extending beyond at least one of the first or second surfaces. The strain sensor further includes a thermally conductive plate separated from the substrate and attached to the thermally conductive post.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

For example, one of the first or second strain-sensitive elements may be positioned between the substrate and the thermally conductive plate. The strain sensor may further include a passivation layer positioned between the one of the first or the second strain-sensitive elements.

In another embodiment, the thermally conductive post may extend between the first and second surfaces within the substrate. The thermally conductive post may be configured to transfer heat between the first and second surfaces. Further, the thermally conductive plate may be configured to absorb heat from an area surrounding at least one of the first and second strain-sensitive elements.

According to another embodiment, the thermally conductive post may extend beyond both the first and second surfaces. The thermally conductive plate may be a first thermally conductive plate. In this regard, the strain sensor may further include a second thermally conductive plate separated from the substrate and attached to the thermally conductive plate opposite the first thermally conductive plate. In some instances, the first strain-sensitive element may be positioned between the substrate and the first thermally conductive plate, and the second strain-sensitive element may be positioned between the substrate and the second thermally conductive plate.

In another embodiment, the first thermally conductive plate may be configured to absorb heat from a heat source. Further, the thermally conductive post may be configured to transfer heat from the first thermally conductive plate to the second thermally conductive plate.

In this regard, a second aspect of the present disclosure includes a strain sensor. The strain sensor includes a flexible substrate configured to deform in response to a force. The strain sensor further includes a pair of strain-sensitive elements disposed on the flexible substrate and configured to produce an electrical response in response to deformation of the flexible substrate. The strain sensor further includes a heat sink offset from the flexible substrate and configured to receive heat induced in at least one of the pair of strain-sensitive elements. The strain sensor further includes a thermally conductive post at least partially encompassed within the flexible substrate.

A number of feature refinements and additional features are applicable in the second aspect and contemplated in light of the present disclosure. These feature refinements and additional features may be used individually or in any combination. As such, each of the following features that will be discussed may be, but are not required to be, used with any other feature combination of the second aspect.

For example, in an embodiment, the deformation of the flexible substrate may induce heat in at least one of the pair of strain-sensitive elements. Further, the thermally conductive post may be configured to maintain a substantially uniform temperature between the pair of strain-sensitive elements by transferring heat from one, or both, of the pair of strain-sensitive elements to the heat sink. In some instances, the pair of strain-sensitive elements may be vertically aligned on the flexible substrate.

According to another embodiment, the thermally conductive post extends through a region defined by one of the pair of strain-sensitive elements. The thermally conductive post may be one of an array of thermally conductive posts. Each of the array of thermally conductive posts may contact the heat sink and the flexible substrate. In some cases, the array of thermally conductive posts surrounds the pair of strain-sensitive elements. Additionally or alternatively, the heat sink may be a planar structure positioned between the pair of strain-sensitive elements such that the thermally conductive post contacts the planar structure.

In this regard, a third aspect of the present disclosure includes a method of distributing heat in a strain sensor. The method includes receiving a force input at an input surface. The force input may heat a first region of a strain sensor positioned below the input surface. The first region may be defined by a first strain-sensitive element. The method further includes transferring energy, through a thermally conductive shaft, between the first region and a second region of the strain sensor. The second region may be defined by a second strain-sensitive element. The method further includes storing energy at a thermal shield coupled to the thermally conductive shaft. The thermal shield may be spaced apart from at least one of the first and second strain-sensitive elements.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combination of the third aspect.

For example, in an embodiment, the method may further include maintaining the first and second regions at a substantially uniform temperature using the thermally conductive shaft and the thermal shield. Further, the transferring energy may include using heat from the first region to heat the second region.

In another embodiment, the first and second strain-sensitive elements may be two of a group of strain-sensitive elements positioned on the strain sensor. The thermally conductive shaft may be one of an array of thermally conductive shafts positioned within the strain sensor. In this regard, the transferring energy may include distributing heat substantially uniformly across the group of strain-sensitive elements using the array of thermally conductive shafts.

According to another embodiment, the storing energy by the thermal shield may reduce a temperature of at least one of the first and second strain-sensitive elements. In some cases, the first and second strain-sensitive elements may be positioned on opposing surfaces of the strain sensor, thereby defining a gap between the at least one of the first and second strain-sensitive elements and the thermal shield.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
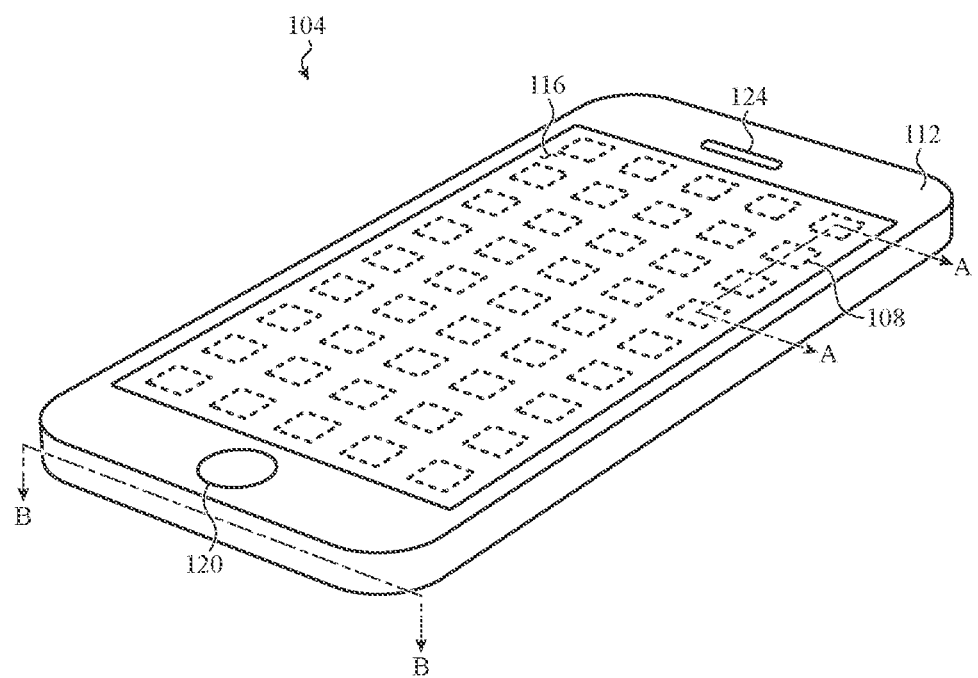
FIG. 1 depicts a top view of a sample input device having strain sensing pixels.

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to a strain sensor and, more particularly, to a strain sensor having a thermally conductive element. The thermally conductive element may be configured to absorb heat. The thermally conductive element may also be configured to transfer heat between localized regions of the strain sensor. The thermally conductive element may be used to distribute heat throughout the strain sensor. This may allow the strain sensor to maintain a substantially uniform temperature using the thermally conductive element.

The strain sensor may include various components that operate together to detect a force input. In one embodiment, the strain sensor includes a substrate having first and second strain-sensitive elements positioned thereon. The first strain-sensitive element may be positioned on a first surface of the substrate and the second strain-sensitive element may be positioned on a second surface of the substrate. The first and second strain-sensitive elements may be vertically aligned (e.g., positioned along a common axis or direction) and define a strain sensing pixel. The strain sensing pixel may be a region of a display or cover glass positioned above the first and second strain-sensitive elements. A force may be received at, or near, the strain sensing pixel. This may cause the substrate to bend, deform, or flex below the strain sensing pixel such that each of the first and second strain-sensitive elements produces an electrical response in response to the bending or deformation. In this manner, the first and second strain-sensitive elements may be used to measure an amount of force associated with the force input at the strain sensing pixel.

To illustrate, a processing unit connected operatively to the strain sensor may measure the respective electrical responses (and the differences therebetween) and determine an amount of force applied at, or near, the strain sensing pixel. In some instances, the strain sensing pixel may be one of an array of strain sensing pixels. This may allow the processing unit to determine an amount of force applied across a continuum of positions at the cover glass using the array of strain sensing pixels.

In some cases, it may be desirable to reduce temperature variations within the strain sensor. To illustrate, the force input may heat a localized region of the strain sensor, for example, such as a localized region associated with the first strain-sensitive element. This may create or induce a temperature variation between the first and second strain-sensitive elements. The respective electrical responses of the first and second strain-sensitive elements (which are used to determine the amount of force associated with the force input) may be sensitive to variations in temperature. Variations in temperature may cause thermal expansion or contraction within the strain-sensitive elements and/or affect various other electrical or mechanical properties of the strain-sensitive elements. This may reduce the accuracy and/or precision with which strain may be measured at the respective strain-sensitive elements. Accordingly, reducing the temperature variation between the first and second strain-sensitive elements may improve the accuracy and/or precision of the resulting force measurements.

In this regard, the strain sensor may have a thermally conductive element. The thermally conductive element may reduce temperature variations within the strain sensor. As one example, the thermally conductive element may transfer heat between the first and the second strain-sensitive elements. This may reduce temperature variations between the first and second strain-sensitive elements, thereby improving force measurements at the strain sensing pixel.

The thermally conductive element may include multiple thermally conductive components to facilitate the foregoing functionality. As a non-limiting illustration, the thermally conductive element may include a thermally conductive post and a thermally conductive plate. The thermally conductive post may be positioned within the substrate and extend beyond at least one of the first and second surfaces of the substrate. This may allow the thermally conductive post to transfer heat through, and away from, the substrate. The thermally conductive plate may be separated from the substrate and attached to the thermally conductive post. As such, one of the first or second strain-sensitive elements may be positioned between the thermally conductive plate and the substrate. The thermally conductive plate may be a heat sink that absorbs heat. This may reduce a temperature of the strain sensor and/or prevent the strain sensor from experiencing an increase in temperature.

In one embodiment, the thermally conductive element may include an array of thermally conductive posts and a pair of thermally conductive plates (e.g., including a first thermally conductive plate and a second thermally conductive plate). At least a subset of the array of thermally conductive posts may be positioned within the substrate and extend beyond both the first and second surfaces of the substrate. The pair of thermally conductive plates may be attached to the subset of the array of thermally conductive posts. For example, a first of the pair of thermally conductive plates may be attached to the subset of the array of thermally conductive posts opposite a second of the pair of thermally conductive plates.

In a sample implementation, one of the pair of thermally conductive plates may be positioned between the substrate and the cover glass. As such, the one of the pair of thermally conductive plates may absorb heat generated or induced from the force input (received at the cover glass) and prevent such heat from being directly absorbed by the first or second strain-sensitive elements. Rather, heat absorbed by the one of the pair of thermally conductive plates may be transferred through the substrate (away from the cover glass) using the array of thermally conductive posts. The second of the pair of thermally conductive plates may absorb heat from the array of thermally conductive posts. Absorbing and distributing heat in this manner may allow the strain sensor to maintain a substantially uniform temperature between the first and second strain-sensitive elements.

It will be appreciated that the thermally conductive element may be arranged and configured in any appropriate manner to distribute heat throughout the strain sensor. In one embodiment, the thermally conductive post may intersect one, or both, of the first and second strain-sensitive elements. Additionally or alternatively, the thermally conductive plate may at least partially contact (or be encompassed by) the substrate. Further, the amount of thermally conductive posts of the array of thermally conductive posts may be increased or decreased to produce a desired thermal distribution throughout the strain sensor.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an input device 104 having strain sensing pixels 108, such as the strain sensing pixels generally discussed above and described in greater detail below. For purposes of illustration, the input device 104 is depicted as having an enclosure 112, a display 116, one or more input/output buttons 120, and a speaker 124. The display 116 may be a substantially transparent component at which the input device 104 is configured to receive a touch and/or force input. The display 116 may also be configured to present an output of the input device 104. It should be noted that the input device 104 may also include various other components, such as one or more ports (e.g., charging ports, data transfer ports, or the like), additional input/output buttons, and so on. As such, the discussion of any input device, such as input device 104 is meant as illustrative only.

In a non-limiting example, as shown in FIG. 1, the input device 104 may be a mobile phone. However, it is understood that input device 104 may be any suitable device having an input surface (e.g., such as the display 116) operating with the strain sensing pixels 108. Other example electronic devices may include wearable devices (including watches, glasses, rings, or the like), health monitoring devices (including pedometers, heart rate monitors, or the like), and other electronic devices, including digital cameras, printers, scanners, security systems or devices, or electronics for automobiles, among other electronic devices.

The strain sensing pixels 108 may correspond to a region of the display 116 below which a pair of strain-sensitive elements (e.g., piezoelectric sensors, strain gauges, or the like, not shown in FIG. 1) are disposed. Analogous to the first and second strain-sensitive elements described above, the pair of strain-sensitive elements may produce an electrical response in response to a force received at, or near, a portion of the display 116 corresponding to one of the strain sensing pixels 108. The strain sensing pixels 108 may form an array of strain sensing pixels. Collectively, the pairs of strain-sensitive elements disposed below the respective strain sensing pixels 108 may define a strain sensor. The strain sensor may be used to detect a force input at a continuum of positions across the display 116 using any of (or a combination of) the strain sensing pixels 108.

A force input at, or near, the strain sensing pixels 108 may generate or induce heat within the strain sensing pixels 108. For example, the force input may be caused by a human finger (e.g., a heat source) touching the display 116. A temperature variation between the human finger and the display 116 (e.g., due a body temperature being greater than a room temperature) may heat the display 116 at an area around the contact location of the force input. In some instances, this may also heat various components disposed below the display 116, including the pair of strain-sensitive elements. In other cases, other heat sources may heat various components disposed below the display 116, including heat generated or induced by a processing unit or other circuitry of the input device 104. In this regard, the strain sensing pixels 108 may be associated with, or coupled to, a thermally conductive element (not shown in FIG. 1), such as the thermally conductive element generally discussed above and described in greater detail below. The thermally conductive element may prevent the pair of strain-sensitive elements from heating and/or from heating substantially unevenly.

Figure 2:
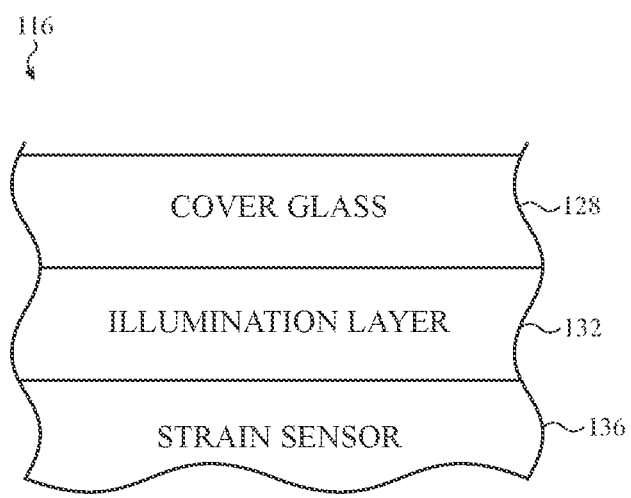
FIG. 2 depicts a simplified cross-sectional view of layers of the sample input device of FIG. 1, taken along line A-A of FIG. 1.

FIG. 2 is a simplified cross-sectional view of layers of the input device 104, taken along line A-A of FIG. 1. In particular, FIG. 2 presents a simplified cross-sectional view of layers of the input device 104 at a portion of the display 116. As depicted, the input device 104 may include a cover glass 128, an illumination layer 132, and a strain sensor 136.

The cover glass 128 may be a substantially transparent substrate. The cover glass 128 may form a barrier between internal components of the input device 104 (e.g., illumination layer 132, strain sensor 136, etc.) and an external environment. The cover glass 128 may be sufficiently rigid so as not to fracture upon the receipt of a force input thereon. Further, the cover glass 128 may be configured to bend by a visually imperceptible amount upon the receipt of the force input. This may cause the strain sensor 136 to experience a strain. The strain may be used to generate an electrical response, which may be used to determine an amount of force associated with the force input. Accordingly, the cover glass 128 may be constructed from any appropriate material, including various glasses, composites, sapphires, or the like, consistent with the embodiments described herein.

The illumination layer 132 may be a light source disposed below the cover glass 128. The illumination layer 132 may be configured to illuminate portions of the cover glass 128. The illumination of the cover glass 128 may be indicative of a function with which a portion of the cover glass 128 is associated. For example, the illumination layer 132 may be configured to display an updated or virtual arrangement of symbols at the cover glass 128 indicative of a function. In some instances, the illumination layer 132 may display such symbols at a portion of the cover glass 128 corresponding to the strain sensing pixels 108. This may prompt a user to provide a force input at a portion of the cover glass 128 corresponding to the strain sensing pixels 108.

The strain sensor 136, described in greater detail below with respect to FIG. 4, may be configured to produce an electrical response in response to a strain experienced therein. The strain sensor 136 may include various combinations of strain-sensitive elements that operate to define, for example, the strain sensing pixels 108 depicted in FIG. 1. Accordingly, a force input received at the cover glass 128 may cause one or more of the strain-sensitive elements of the strain sensor 136 to experience strain and thus generate a corresponding electrical response. The electrical response may be used to determine the amount of force applied to the cover glass 128 due to the force input. The strain sensor 136 may also include various configurations of thermally conductive elements. This may allow heat generated or induced from the force input to be distributed throughout the strain sensor 136, thereby enhancing the precision and/or accuracy of the force measurements made with the strain sensor 136.

Figure 3:
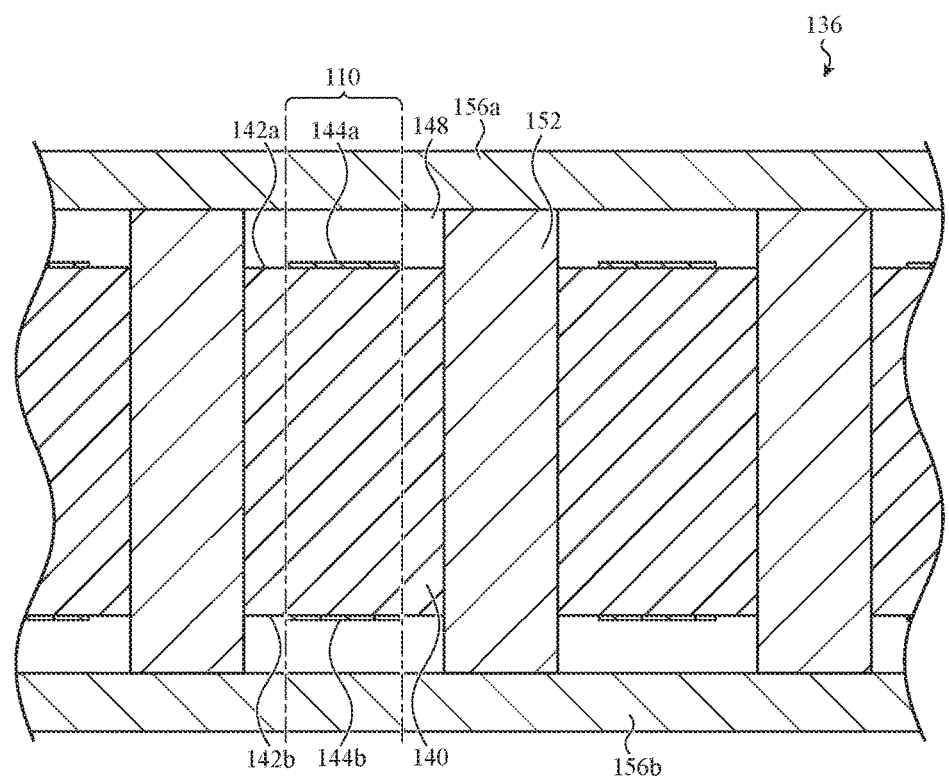
FIG. 3 depicts a cross-sectional view of the strain sensor of FIG. 2, taken along line A-A of FIG. 1.

FIG. 3 is a cross-sectional view of the strain sensor 136 of FIG. 2, taken along line A-A of FIG. 1. The strain sensor 136 may include various components that operate together to produce an electrical response in response to a strain experience within the strain sensor 136. The strain sensor 136 may also include various thermally conductive elements to absorb, distribute, and transfer heat throughout the strain sensor 136. As depicted, the strain sensor 136 may include substrate 140; strain-sensitive elements 144a, 144b; passivation layer 148; thermally conductive posts 152; and thermally conductive plates 156a, 156b. The strain-sensitive element 144a may define a first region of the strain sensor 136 and the strain-sensitive element 144b may define a second region of the strain sensor 136.

The substrate 140 may be constructed of any appropriate material that is sufficiently rigid to structurally support the strain-sensitive elements 144a, 144b, while maintaining the ability to flex, bend, or otherwise deform in response to a force. Further, the substrate 140 may be an insulating component, such that it prevents the transmission of electricity and/or heat therethrough. Example materials that form a portion, or all, of the substrate 140 may include rubber, plastic, composites, or the like.

The strain-sensitive elements 144a, 144b may be any piezoelectric element, strain gauge, or the like that exhibits a change in electrical resistance in response to a change in strain. This change in resistance may be correlated to, or used to estimate, an applied force, for example, such as the applied force used to produce the strain within the strain-sensitive elements 144a, 144b.

As described with respect to FIG. 1, one of the strain sensing pixels 108 (not shown in FIG. 3) may correspond to a region of the display 116 below which the strain-sensitive elements 144a, 144b are disposed. As shown in FIG. 3, the portion of the strain sensor 136 disposed below the strain sensing pixels 108 is depicted by strain sensing pixel area 110. The strain-sensitive elements 144a, 144b may therefore be disposed within the strain sensing pixel area 110 and be connected operatively to measure a force received at a respective strain sensing pixels 108.

In one embodiment, a force received at the display 116 in, or around, the strain sensing pixels 108 may cause the substrate 140 to bend or flex and thus produce a strain within the strain-sensitive elements 144a, 144b. For example, the strain-sensitive element 144a may be positioned on a first surface 142a of the substrate 140 and the strain-sensitive element 144b may be positioned on a second surface 142b of the substrate 140. Each of the strain-sensitive elements 144a, 144b may be positioned below the area of the display 116 corresponding to the strain-sensing pixel 108 (e.g., such as within strain sensing pixel area 110). As depicted in FIG. 3, the strain-sensitive elements 144a, 144b may be vertically aligned (e.g., positioned along a common axis) on the substrate 140 and positioned on opposing surfaces of the substrate 140. Accordingly, in response to a force received at the strain sensing pixels 108, the strain-sensitive element 144a may experience strain caused by a compression of the first surface 142a and the strain-sensitive element 144b may experience strain caused by a tension or elongation of the second surface 142b. The change in electrical resistance exhibited by each of the strain-sensitive elements 144a, 144b may be used by the strain sensor 136 to determine the amount of force received at the display 116.

As described with respect to FIG. 1, a force input may generate or induce heat within the strain sensor 136 (e.g., such as at strain sensing pixel area 110). As one example, a force input may generate or induce heat within the strain sensor 136 near the strain-sensitive element 144a. This may cause the strain-sensitive element 144a to initially have a different temperature than strain-sensitive element 144b. Such variation in temperature may reduce the accuracy and/or precision with which strain may be measured using the strain-sensitive elements 144a, 144b. For example, temperature variations may expand or contract the strain-sensitive elements 144a, 144b (or portions thereof), which may limit the ability of the strain sensor 136 to measure strain with the strain-sensitive elements 144a, 144b. As such, it may be desirable to reduce or eliminate the temperature variation between the strain-sensitive elements 144a, 144b.

In this regard, the strain sensor 136 may include thermally conductive posts 152 and thermally conductive plates 156a, 156b. The thermally conductive posts 152 and thermally conductive plates 156a, 156b may collectively define a thermally conductive element or structure of the strain sensor 136. Generally, the thermally conductive element is configured to absorb, distribute, and/or transfer heat throughout the strain sensor 136. This may reduce temperature variations within the strain sensor 136 and, in particular, reduce temperature variations between the strain-sensitive elements 144a, 144b.

As depicted in FIG. 3, the thermally conductive plates 156a, 156b may be positioned on, or near, opposing surfaces of the substrate 140. For example, the thermally conductive plate 156a may be positioned proximal to, and separated from, the first surface 142a and the thermally conductive plate 156b may be positioned proximal to, and separated from, the second surface 142b. Accordingly, the thermally conductive plates 156a, 156b may be offset from the substrate 140 such that there is a gap between one, or both, of the thermally conductive plates 156a, 156b and the substrate 140. This may allow, as explained in greater detail below, one or more strain-sensitive elements and a passivation layer to be positioned between one of the thermally conductive plates 156a, 156b and the substrate 140.

The thermally conductive posts 152 may be attached to (or formed integrally with) one or both, of the thermally conductive plates 156a, 156b. As shown in FIG. 3, the thermally conductive posts 152 may be positioned within, and extend through, the substrate 140 such that thermally conductive posts 152 are attached to the thermally conductive plates 156a, 156b on either side of the substrate 140. As such, the thermally conductive posts 152 may extend beyond one or both of the first and second surfaces 142a, 142b of the substrate 140.

The thermally conductive posts 152 and the thermally conductive plates 156a, 156b may be attached such that heat flows through, and between, the thermally conductive posts 152 and the thermally conductive plates 156a, 156b. In one implementation, the thermally conductive plate 156a may be configured to absorb heat caused by a force input. For example, the thermally conductive plate 156a may be positioned proximal to the display 116. A force input received at the display 116 may heat, for example and with reference to FIG. 2, cover glass 128. Subsequently, the thermally conductive plate 156a (disposed below the cover glass 128) may absorb such heat. This may allow the thermally conductive plate 156a to prevent the strain-sensitive element 144a (and/or other components of the strain sensor 136) from being heated by the force input. For example, the thermally conductive plate 156a may absorb heat generated or induced from the force input and cause heat to be directed away from the strain-sensitive element 144a.

In one implementation, heat absorbed by the thermally conductive plate 156a may be directed through the substrate 140 using the thermally conductive posts 152. Heat may thus be directed away from the strain-sensitive element 144a by directing heat through the substrate 140 and towards the strain-sensitive element 144b. In this regard, the thermally conductive posts 152 may form thermally conductive vias or shafts extending between (or partially between) the first and second surfaces 142a, 142b of the substrate 140.

Heat transferred through the substrate 140 using the thermally conductive posts 152 may be transferred away from the substrate 140 and absorbed by the thermally conductive plate 156b. The thermally conductive plate 156b may be a heat sink that absorbs unwanted or excess heat within the strain sensor 136 (e.g., such as that generated or induced by a force input at display 116). As shown in FIG. 3, the heat sink may be a substantially planar structure that is positioned along a surface of the substrate 140 (e.g., along first or second surfaces 142a, 142b).

The distribution of heat through, and between, the thermally conductive posts 152 and the thermally conductive plates 156a, 156b may allow the strain sensor 136 to maintain a substantially uniform temperature. By way of particular example, such distribution of heat may allow the strain-sensitive elements 144a, 144b to maintain a substantially uniform temperature. For example, the thermally conductive posts 152 and the thermally conductive plates 156a, 156b may transfer heat from the strain-sensitive element 144a (or an area surrounding the strain-sensitive element 144a) to the strain-sensitive element 144b (or an area surrounding the strain-sensitive element 144b). This may reduce temperature variations between the first and second strain-sensitive elements 144a, 144b that may otherwise impede the accuracy and/or precision of strain measured using the strain-sensitive elements 144a, 144b.

It will be appreciated that the thermally conductive posts 152 and the thermally conductive plates 156a, 156b depicted in FIG. 3 are presented for purpose of illustration only. In other embodiments, the strain sensor 136 may have more or fewer thermally conductive posts 152, which may or may not contact the thermally conductive plates 156a, 156b. Further, in some implementations, the strain sensor 136 may include a single thermally conductive plate, for example, such as one of the thermally conductive plates 156a, 156b.

The thermally conductive posts 152 and the thermally conductive plates 156a, 156b may be constructed out of any appropriate thermally conductive material. The thermally conductive posts 152 and the thermally conductive plates 156a, 156b may have a higher thermal conductivity than the substrate 140. This may be desirable in order to direct heat away from the strain-sensitive elements 144a, 144b. In the embodiment depicted in FIG. 3, the thermally conductive posts 152 and the thermally conductive plates 156a, 156b are constructed from copper or copper alloy. In other embodiments, the thermally conductive posts 152 and the thermally conductive plates 156a, 156b may be constructed from silver, aluminum, magnesium, and/or other metals or metal alloys having a sufficiently high thermal conductivity to distribute or otherwise transfer heat throughout the strain sensor 136 according to the embodiments described herein. Further, the thermally conductive posts 152 and the thermally conductive plates 156a, 156b may be constructed from different materials having different thermal conductivities as may be appropriate for a given application.

As shown in FIG. 3, the strain sensor 136 may also include the passivation layer 148. The passivation layer 148 may separate the strain-sensitive elements 144a, 144b from the thermally conductive posts 152 and/or the thermally conductive plates 156a, 156b. The passivation layer 148 may electrically and/or thermally isolate the strain-sensitive elements 144a, 144b from the thermally conductive posts 152 and/or the thermally conductive plates 156a, 156b. Accordingly, the strain-sensitive elements 144a, 144b may experience strain upon the bending of the substrate 140 without being contacted by (or otherwise directly impacted by) the thermally conductive plates 156a, 156b. In some cases, the passivation layer 148 may be constructed from a dielectric material.

Figure 4:
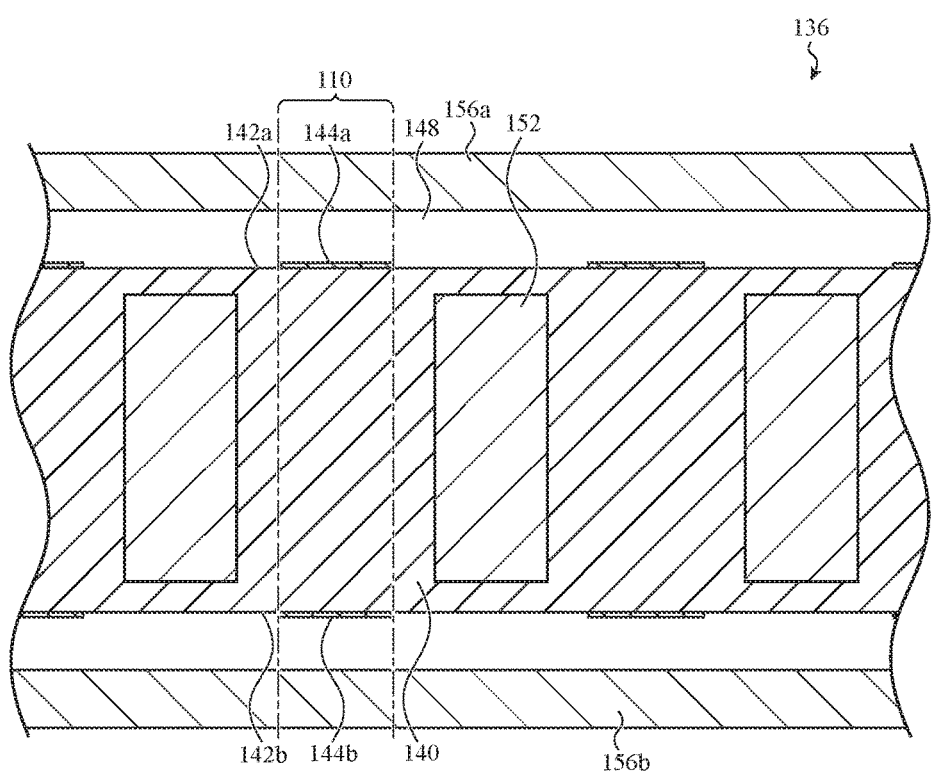
FIG. 4 depicts a cross-sectional view of the strain sensor of FIG. 2, taken along line A-A of FIG. 1.
Figure 5:
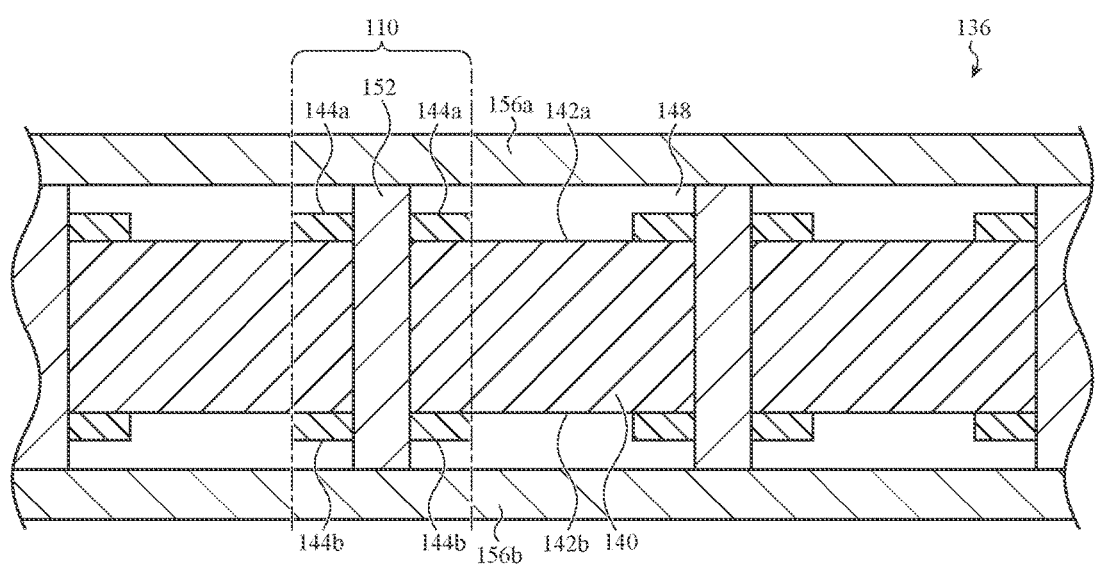
FIG. 5 depicts a cross-sectional view of the strain sensor of FIG. 2, taken along line A-A of FIG. 1.
Figure 6:
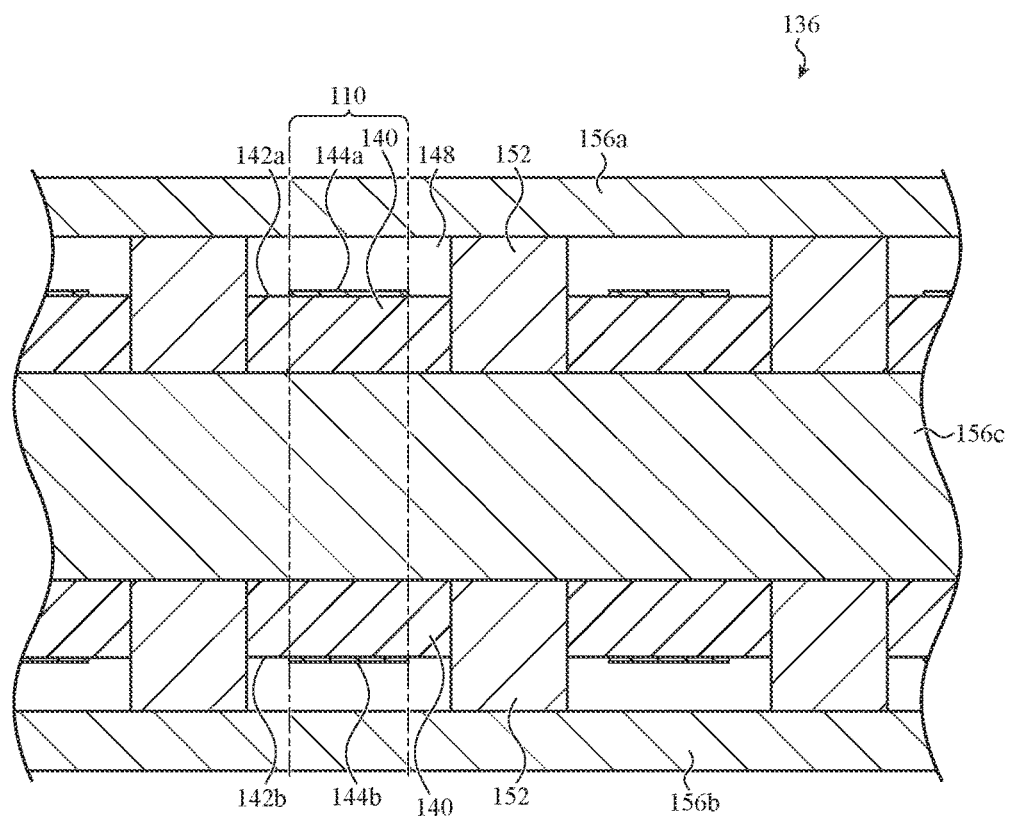
FIG. 6 depicts a cross-sectional view of the strain sensor of FIG. 2, taken along line A-A of FIG. 1.

FIGS. 4-6 depict cross-sectional views of the strain sensor 136 of FIG. 2, taken along line A-A of FIG. 1. In particular, FIGS. 4 and 6 present cross-sectional views of alternate embodiments of the strain sensor 136 described above with respect to FIG. 3.

As illustrated in the embodiment of FIG. 4, the strain sensor 136 includes substrate 140; first and second surfaces 142a, 142b; strain-sensitive elements 144a, 144b; passivation layer 148; thermally conductive posts 152; and thermally conductive plates 156a, 156b. The strain sensor 136 may be substantially analogous to the strain sensor 136 described with respect to FIG. 3. For example, the thermally conductive posts 152 and the thermally conductive plates 156a, 156b may be configured to absorb and distribute heat throughout the strain sensor 136. This may allow the strain sensor 136 to maintain a substantially uniform temperature. Further, the strain sensor 136 may include the strain sensing pixel area 110 corresponding to a portion of the strain sensor 136 disposed below the strain sensing pixels 108.

Notwithstanding the foregoing similarities, the thermally conductive posts 152 depicted in FIG. 4 may be at least partially encompassed within the substrate 140. For example, the thermally conductive posts 152 may be positioned within the substrate 140 such that the thermally conductive posts 152 do not extend beyond a surface of the substrate 140. As such, the thermally conductive posts 152 may be spaced apart from one or more of the thermally conductive plates 156a, 156b.

The partially (or fully) encompassed thermally conductive posts 152 may be used to distribute heat within the strain sensor 136. For example, the partially (or fully) encompassed thermally conductive posts 152 may transfer heat between various portions of the substrate 140. This may allow the strain sensor 136 to maintain a substantially temperature. This configuration may be beneficial in embodiments where the strain sensor 136 includes a relatively thin passivation layer 148 and/or a thermally conductive passivation layer 148.

It will be appreciated that, in some embodiments, the thermally conductive posts 152 may be arranged non-uniformly throughout the substrate 140. As one example, a first subset of the thermally conductive posts 152 may be at least partially encompassed within the substrate 140 (e.g., as depicted in FIG. 4), and a second subset of the thermally conductive posts 152 may extend beyond a surface of the substrate 140 (e.g., as depicted in FIG. 3). This may allow the thermally conductive posts 152 to be arranged in a variety of manners to distribute heat within the strain sensor 136, as may be appropriate for a given application.

As illustrated in the embodiment of FIG. 5, the strain sensor 136 includes: substrate 140; first and second surfaces 142a, 142b; strain-sensitive elements 144a, 144b; passivation layer 148; thermally conductive posts 152; and thermally conductive plates 156a, 156b. The strain sensor 136 may be substantially analogous to the strain sensor 136 described with respect to FIG. 3. For example, the thermally conductive posts 152 and the thermally conductive plates 156a, 156b may be configured to absorb and distribute heat throughout the strain sensor 136. This may allow the strain sensor 136 to maintain a substantially uniform temperature. Further, the strain sensor 136 may include the strain sensing pixel area 110 corresponding to a portion of the strain sensor 136 disposed below the strain sensing pixels 108.

Notwithstanding the foregoing similarities, the thermally conductive posts 152 depicted in FIG. 5 may be positioned within the substrate 140 and extending through a region defined by the strain-sensitive elements 144a, 144b. The thermally conductive posts 152 may extend beyond the strain-sensitive elements 144a, 144b and attach to the thermally conductive plates 156a, 156b at a position spaced apart from the strain-sensitive elements 144a, 144b.

The configuration of the thermally conductive posts 152 and the strain-sensitive elements 144a, 144b may contribute to maintaining a uniform temperature throughout the strain sensor 136. For example, the temperature variation between the strain-sensitive elements 144a, 144b may at least partially depend on the distance between the strain-sensitive elements 144a, 144b and the thermally conductive posts 152. As such, the intersecting of the thermally conductive posts 152 and a region defined by the strain-sensitive elements 144a, 144b may reduce the temperature variation between the strain-sensitive elements 144a, 144b. For example, this may increase the efficiency of the transfer of heat between the thermally conductive posts 152 and the strain-sensitive elements 144a, 144b. To illustrate, the strain-sensitive elements 144a, 144b may encompass or surround the thermally conductive posts 152, thereby increasing the surface area of the thermally conductive posts 152 that may absorb heat from the strain-sensitive elements 144a, 144b. This may increase the efficiency and/or rate at which heat is transferred between the strain-sensitive elements 144a, 144b and subsequently reduce a temperature variation between the strain-sensitive elements 144a, 144b.

As illustrated in the embodiment of FIG. 6, the strain sensor 136 includes: substrate 140; first and second surfaces 142a, 142b; strain-sensitive elements 144a, 144b; passivation layer 148; thermally conductive posts 152; and thermally conductive plates 156a, 156b. The strain sensor 136 may be substantially analogous to the strain sensor 136 described with respect to FIG. 3.

Notwithstanding the foregoing similarities, the strain sensor 136 depicted in FIG. 6 may include thermally conductive plate 156c. The thermally conductive plate 156c may be substantially analogous to the thermally conductive plates 156a, 156b described above with respect to FIG. 3. For example, the thermally conductive plate 156c may be constructed from a thermally conductive material and configured to absorb and/or transfer heat within the strain sensor 136.

As shown, the thermally conductive plate 156c may be positioned within the substrate 140 and between the strain-sensitive elements 144a, 144b. The thermally conductive posts 152 may intersect the thermally conductive plate 156c at a position within the substrate 140. In one implementation, the thermally conductive plate 156c may absorb heat from the thermally conductive posts 152. This may allow the thermally conductive posts 152 to draw heat away from the strain-sensitive elements 144a, 144b and toward the thermally conductive plate 156c. Accordingly, the thermally conductive plate 156c may be configured as a heat sink configured to absorb and store excess heat within the strain sensor 136.

Figure 7A:
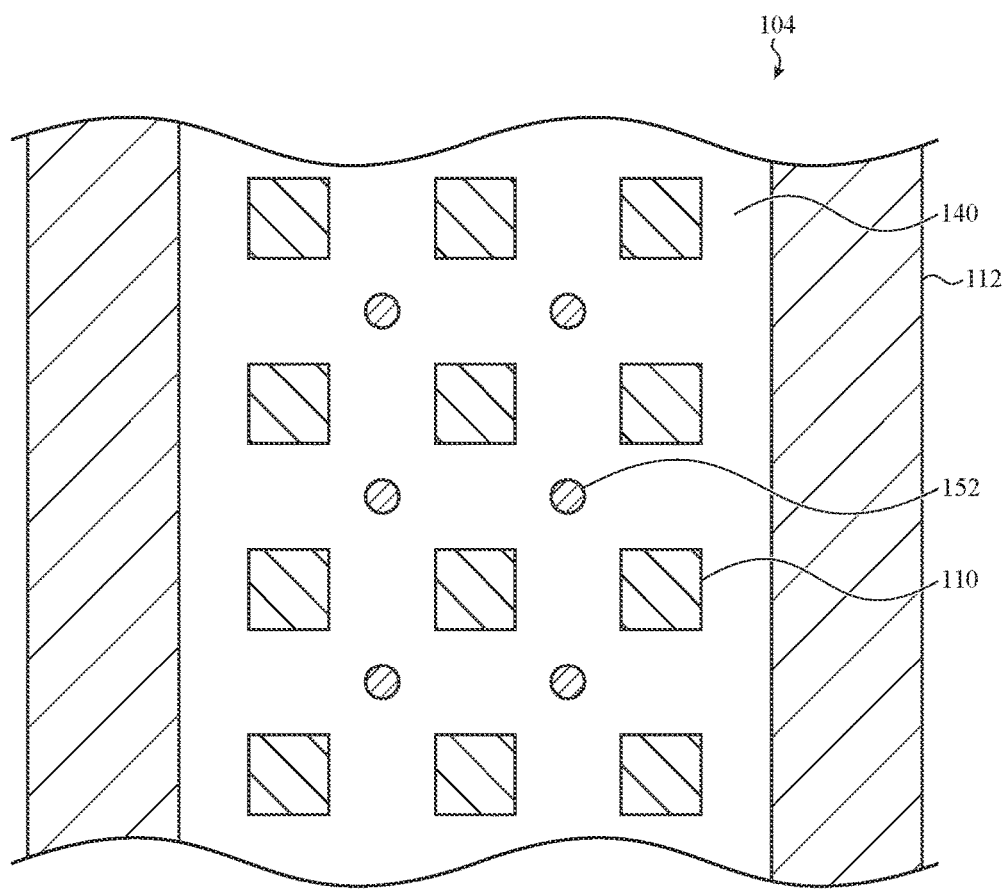
FIG. 7A depicts a cross-sectional view of the sample input device of FIG. 1, taken along line B-B of FIG. 1.

FIG. 7A is a cross-sectional view of the input device 104 of FIG. 1, taken along line B-B of FIG. 1. As depicted, the input device 104 includes the enclosure 112, the substrate 140, the strain sensing pixel areas 110, and the thermally conductive posts 152.

The strain sensing pixel areas 110 may be representative of the array of strain sensing pixels 108 described above with respect to FIG. 1. As described with respect to FIG. 1, strain sensing pixels 108 may be an area of the display 116 below which a pair of strain-sensitive elements are disposed. Accordingly, each of the strain sensing pixel areas 110 depicted in FIG. 7A may include a pair of strain-sensitive elements (e.g., such as strain-sensitive elements 144a, 144b described with respect to FIG. 3) which may be used to measure a force input at the strain sensing pixels 108.

A force input received at the display 116 may cause the substrate 140 to bend, flex, and/or otherwise deform. The bending, flexing, and/or deformation of the substrate 140 may be localized around a location of the display 116 at which the force input is received. In one implementation, the array of strain sensing pixels 108 may be used to determine a magnitude and/or location of the force input. For example, the strain-sensitive elements exhibiting the highest degree of strain may correspond to the location of the force input at the display 116. This may be used to associate the force input with a region of the display 116, for example, such as a region of the display 116 associated with a function that may be used to control the input device 104.

The thermally conductive posts 152 may be one of an array of thermally conductive posts that are disposed across the substrate 140. The thermal variation within, for example, components of the strain sensor 136 positioned within the strain sensing pixel 108 may depend on the amount and/or the density of the array of thermally conductive posts 152. Broadly, as the amount of the thermally conductive posts 152 is increased, such temperature variations may be reduced. For example, increasing the amount of conductive posts 152 may increase the efficiency of the transfer of heat between the strain-sensitive elements 144a, 144b and thereby reduce temperature variations therebetween.

Figure 7B:
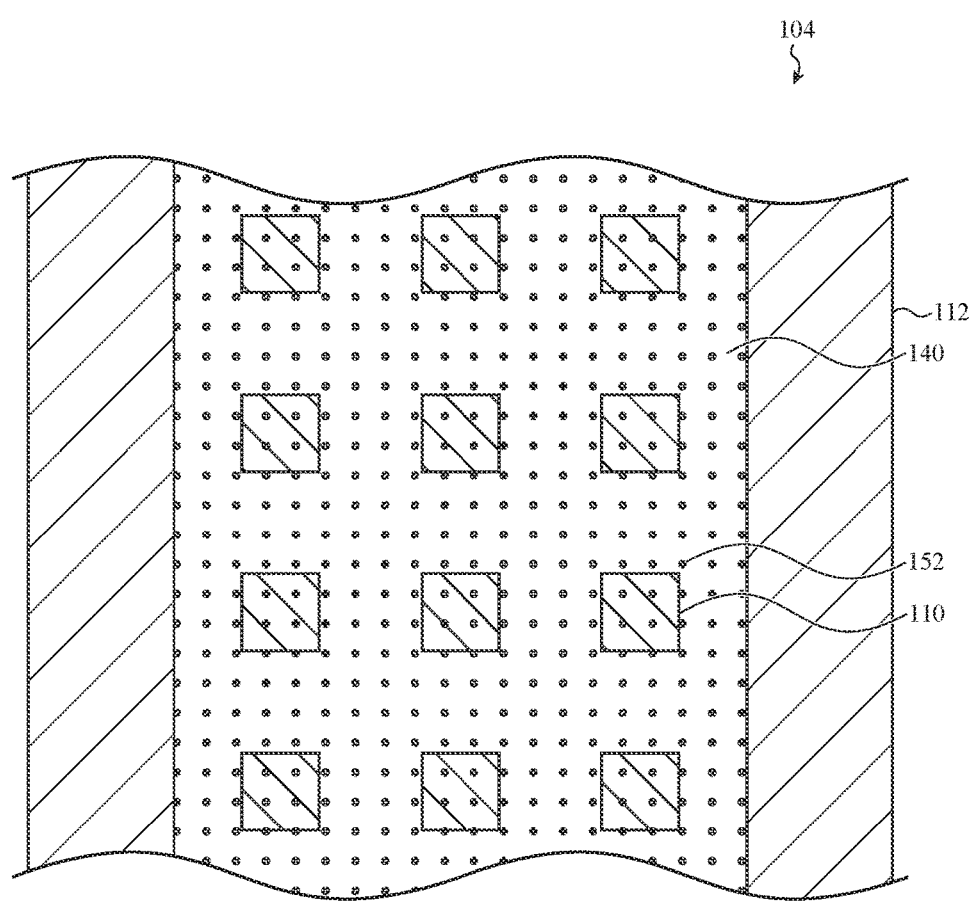
FIG. 7B depicts a cross-sectional view of the sample input device of FIG. 1, taken along line B-B of FIG. 1.

FIG. 7B presents an example embodiment of the input device 104 of FIG. 1, taken long line B-B of FIG. 1, having an increased density of thermally conductive posts 152. As shown in FIG. 7A, the thermally conductive posts 152 may be positioned across the substrate 140 and extend through both the substrate 140 and the strain sensing pixels 108.

Turning next to FIGS. 8A-8F, a cross-sectional view of a strain sensor 836 is shown undergoing various processing steps. In particular, FIGS. 8A-8F depict the formation of the strain sensor 836. FIGS. 8A-8F shows an illustrative cross-sectional view of the strain sensor 836 taken along line A-A of FIG. 1. The strain sensor 836 shown and described with respect to FIGS. 8A-8F may be substantially analogous to the strain sensor 136 described above with respect to FIG. 3. In this regard, analogous to the components described in relation to the embodiments of FIG. 3, the strain sensor 836 may include: substrate 840; first and second surfaces 842a, 842b; strain-sensitive elements 844a, 844b; passivation layer 848; thermally conductive post 852; and thermally conductive plates 856a, 856b. It is understood that similarly numbered components may function in a substantially similar fashion. Redundant explanation of these components has been omitted for clarity.

Figure 8A:
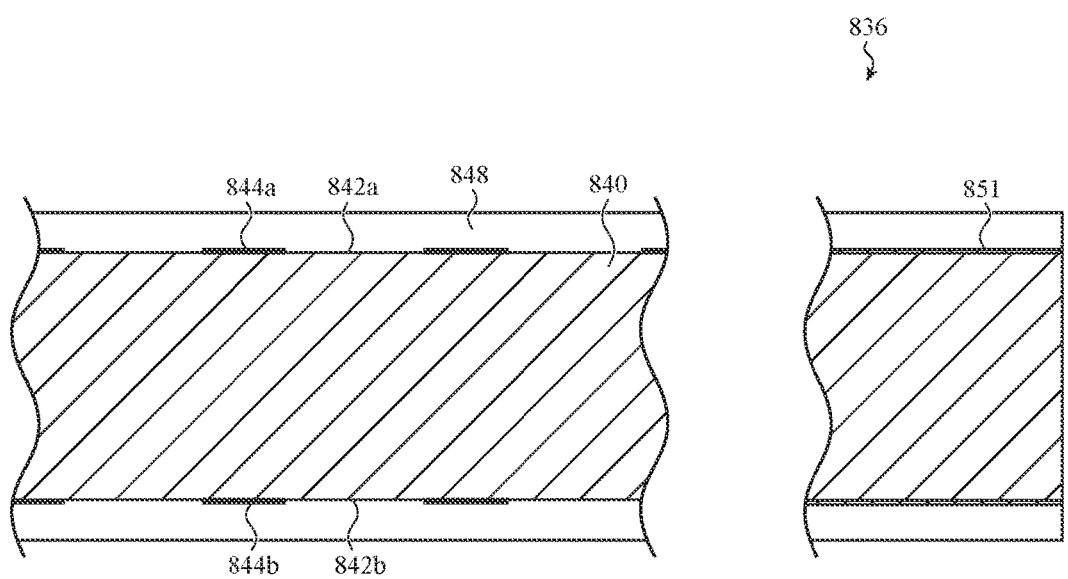
FIG. 8A depicts a cross-sectional view of the strain sensor of FIG. 2 undergoing a process for forming the strain sensor.

FIG. 8A shows a cross-sectional view of the strain sensor 836 undergoing a processing step for forming the strain sensor 836. In particular, FIG. 8A shows the strain-sensitive elements 844a, 844b attached to the substrate 840. The strain-sensitive element 844a may be attached to the first surface 842a and the strain-sensitive element 844b may be attached to the second surface 842b. The first surface 842a and the second surface 842b may be opposing external surfaces of the substrate 840. The strain-sensitive elements 844a, 844b may be vertically aligned on the substrate 840. The strain-sensitive elements 844a, 844b may be connected to a contact pad area, such as contact pad area 851 (e.g., such as an area containing an anisotropic conductive film). The contact pad area 851 may be used to connect the strain-sensitive element 844a, 844b to any appropriate strain sensing circuitry. Such strain sensing circuitry may be connected to a processor of, with reference to FIG. 1, the input device 104. This may allow the input device 104 to measure an amount of force associated with a force input applied at, or near, the strain-sensitive elements 844a, 844b.

FIG. 8A also shows passivation layer 848 applied over (and attached to) the strain-sensitive elements 844a, 844b and the first and second surfaces 842a, 842b, respectively. As explained in greater detail above with respect to FIG. 3, the passivation layer may provide an electrical and/or thermal barrier encompassing a portion of the strain-sensitive elements 844a, 844b.

Figure 8B:
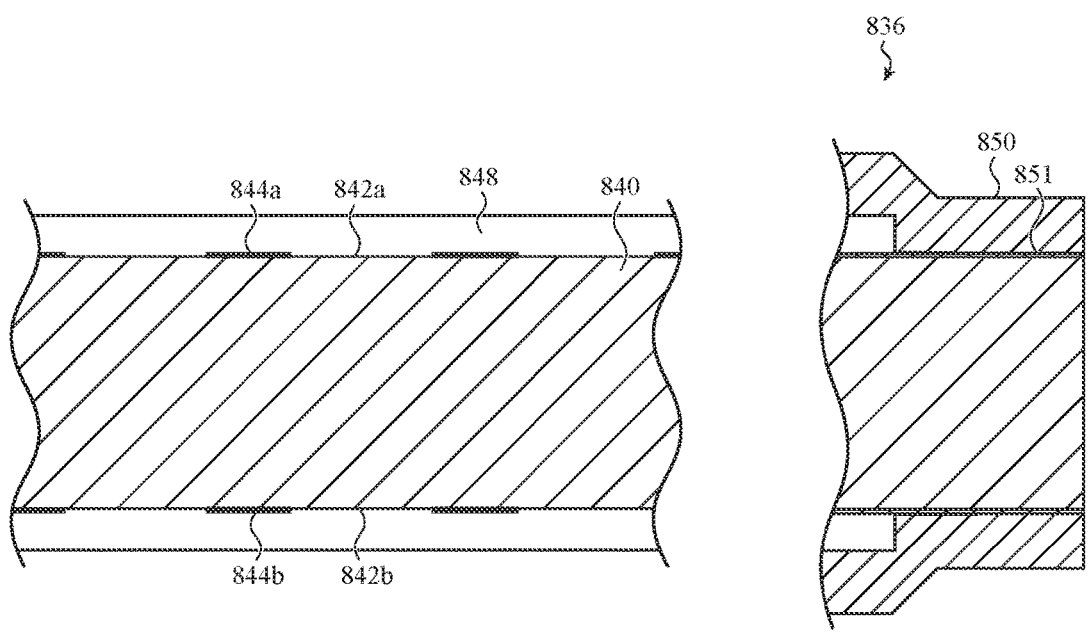
FIG. 8B depicts a cross-sectional view of the strain sensor of FIG. 2 undergoing a process for forming the strain sensor.

FIG. 8B shows a cross-sectional view of the strain sensor 836 undergoing a processing step for forming the strain sensor 836. In particular, FIG. 8B shows a plating mask 850 applied over the contact pad area 851. The plating mask 850 may provide a removable barrier between the contact pad area 851 and an external environment. The plating mask 850 may be configured to receive a coating and/or plating at a surface of the plating mask 850 facing the external environment, while preventing such coating and/or plating from being applied to, or otherwise interfering with, the contact pad area 851.

Figure 8C:
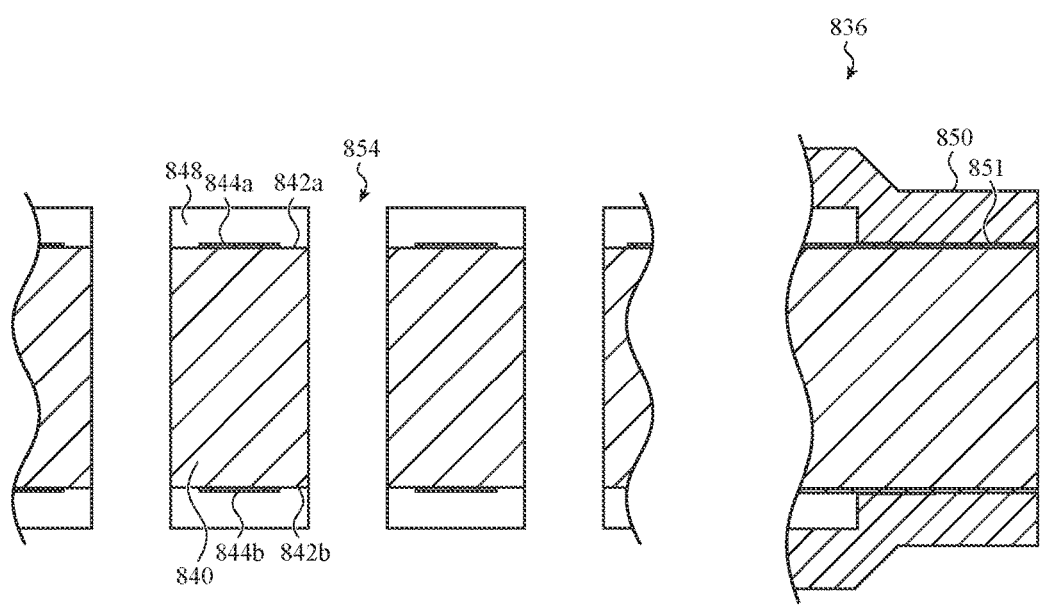
FIG. 8C depicts a cross-sectional view of the strain sensor of FIG. 2 undergoing a process for forming the strain sensor.

FIG. 8C shows a cross-sectional view of the strain sensor 836 undergoing a processing step for forming the strain sensor 836. In particular, FIG. 8C shows holes 854 being formed through the substrate 840. In one embodiment, a laser drill may be used to form the holes 854. The holes 854 may extend through the passivation layer 848 and the substrate 840. The holes 854 may be of a sufficient size and shape to receive a thermally conductive material, for example, such as that described with respect to the embodiment of FIG. 8E.

Figure 8D:
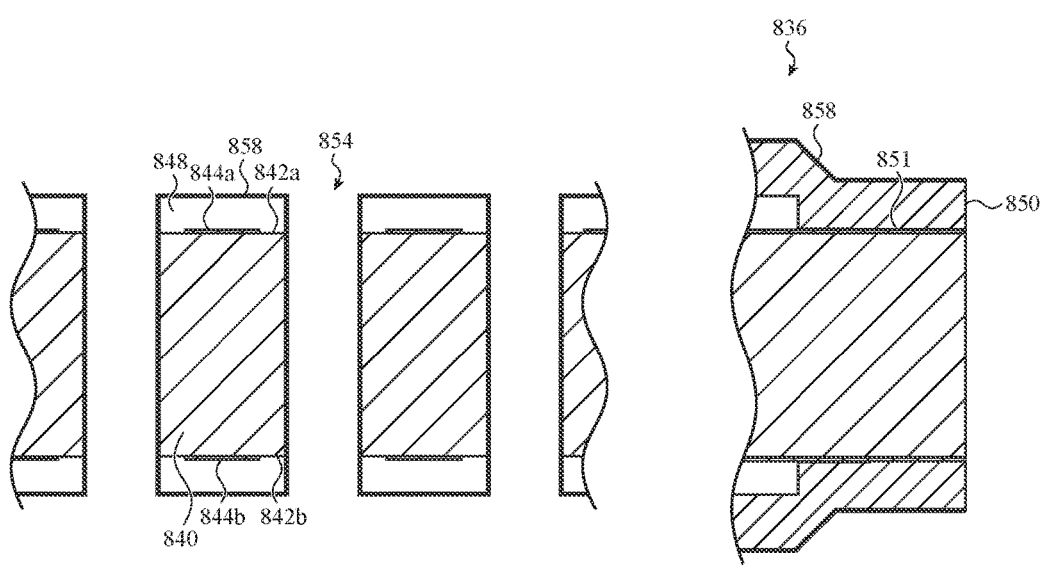
FIG. 8D depicts a cross-sectional view of the strain sensor of FIG. 2 undergoing a process for forming the strain sensor.

FIG. 8D shows a cross-sectional view of the strain sensor 836 undergoing a processing step for forming the strain sensor 836. In particular, FIG. 8D shows an electroless plate layer 858 formed over a surface of the strain sensor 836. The electroless plate layer 858 may form a protective barrier between various components of the strain sensor 836 and an external environment. For example, the electroless plate layer 858 may provide a protective barrier between various thermally conductive elements of the strain sensor 836 and the substrate 840 and/or the passivation layer 848. The electroless plate layer 858 may be deposited on the strain sensor 836 without passing an electrical current through the strain sensor 836 (or a portion thereof).

Figure 8E:
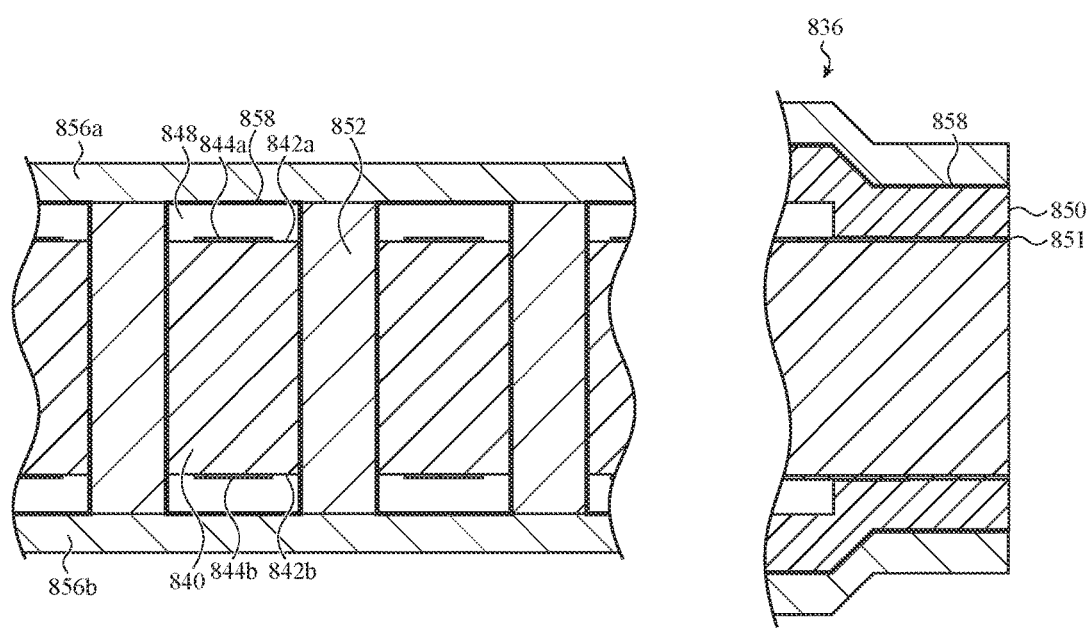
FIG. 8E depicts a cross-sectional view of the strain sensor of FIG. 2 undergoing a process for forming the strain sensor.

FIG. 8E shows a cross-sectional view of the strain sensor 836 undergoing a processing step for forming the strain sensor 836. In particular, FIG. 8E shows thermally conductive posts 852 and thermally conductive plates 856a, 856b being electroplated onto the strain sensor 836. In one embodiment, electrical current may be passed through a portion of the strain sensor 836 (e.g., such as electroless plate layer 858) in order to form or plate a thermally conductive material onto the strain sensor 836. For example, a thermally conductive material may be electroplated onto the strain sensor 836 in order to form thermally conductive posts 852 within the holes 854 (not shown in FIG. 8E). As another example, a thermally conductive material may be electroplated onto the strain sensor 836 in order to form the thermally conductive plates 856a, 856b. The thermally conductive plates 856as, 856b may be attached to the thermally conductive posts 852 (and separated from the substrate 840). As shown in FIG. 8E, a portion of thermally conducive material may be applied over the plating mask 850.

Figure 8F:
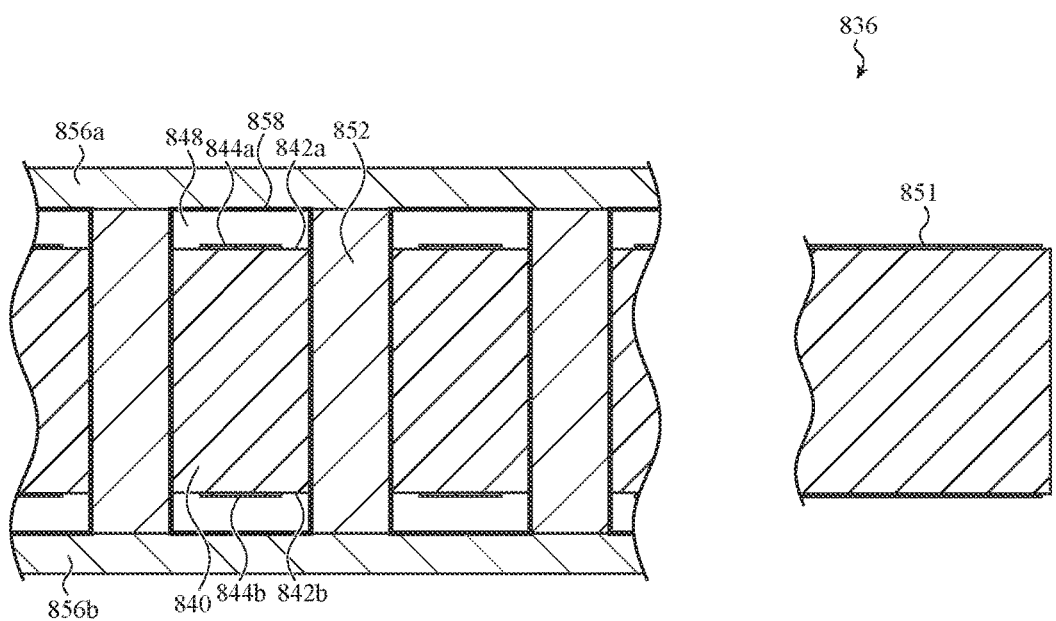
FIG. 8F depicts a cross-sectional view of the strain sensor of FIG. 2 undergoing a process for forming the strain sensor.

FIG. 8F shows a cross-sectional view of the strain sensor 836 undergoing a processing step for forming the strain sensor 836. In particular, FIG. 8F shows the strain sensor 836 free of the plating mask 850 subsequent to the thermally conductive material being electroplated to the strain sensor 836 (e.g., as described with respect to FIG. 8E). Removal of the plating mask 850 may remove thermally conductive material from the portion of the strain sensor 836 surrounding the contact pad area 851. As such, upon removal of the plating mask 850, a portion of the contact pad area 851 may be exposed. This may allow the contact pad area 851 to be connected to a processor or other circuitry of, with reference to FIG. 1, the input device 104.

Figure 9:
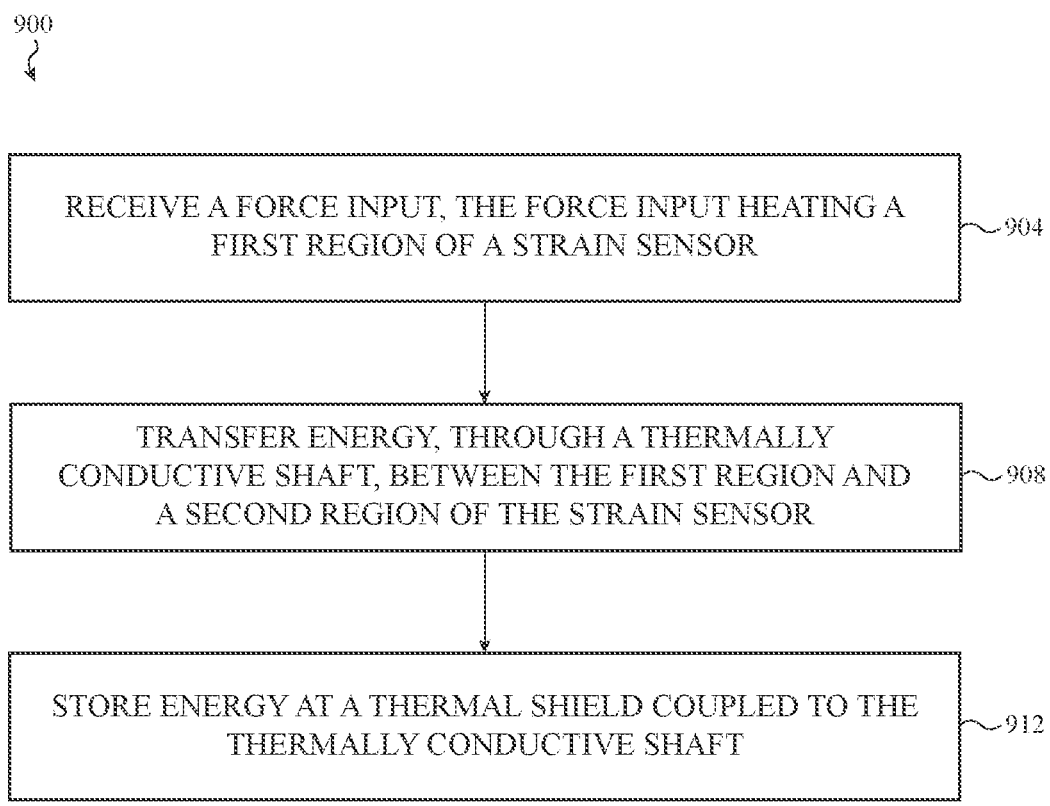
FIG. 9 is a flow diagram of a method of distributing heat in a strain sensor.

To facilitate the reader's understanding of the various functionalities of the embodiments discussed herein, reference is now made to the flow diagram in FIG. 9, which illustrates process 900. While specific steps (and orders of steps) of the methods presented herein have been illustrated and will be discussed, other methods (including more, fewer, or different steps than those illustrated) consistent with the teachings presented herein are also envisioned and encompassed with the present disclosure.

In this regard, with reference to FIG. 9, process 900 relates generally to distributing heat in a strain sensor. The process 900 may be used in conjunction with the input device described herein (e.g., input device 104 described with respect to FIG. 1).

At operation 904, an input surface may receive a force input that heats a first region of a strain sensor positioned below the input surface. The first region may be defined by a first strain-sensitive element. For example and with reference to FIGS. 1-3, the display 116 may receive a force input. The force input may heat a portion of the cover glass 128 and the strain sensor 136 positioned below the cover glass 128. In particular, the force input may heat a portion of the strain sensor 136 including the strain-sensitive element 144a.

At operation 908, a thermally conductive shaft may transfer energy between the first region of the strain sensor and a second region of the strain sensor. For example and with reference to FIG. 3, the thermally conductive posts 152 may transfer energy between the strain-sensitive element 144a and the strain-sensitive element 144b. This may allow the strain-sensitive elements 144a, 144b to reach an equilibrium temperature such that the strain-sensitive elements maintain a substantially uniform temperature.

At operation 912, a thermal shield, that is coupled operatively to the thermally conductive shaft, may store energy. The thermal shield may be spaced apart from at least one of the first and second strain-sensitive elements. For example and with reference to FIG. 3, the thermally conductive plate 156b (e.g., thermal shield) may be coupled to the thermally conductive posts 152. The thermally conductive plate 156b may store heat absorbed from the thermally conductive posts 152. Accordingly, the thermally conductive plate 156b may function as a heat sink at which excess heat may be absorbed. This may allow the strain sensor 136 to maintain a substantially uniform temperature.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A strain sensor, comprising:
a substrate;
a first strain-sensitive element positioned on a first surface of the substrate;
a second strain-sensitive element positioned on a second surface of the substrate;
a thermally conductive post positioned within the substrate and extending beyond at least one of the first or second surfaces; and
a thermally conductive plate separated from the substrate and attached to the thermally conductive post.

2. The strain sensor of claim 1, wherein one of the first or second strain-sensitive elements is positioned between the substrate and the thermally conductive plate.

3. The strain sensor of claim 2, further comprising:
a passivation layer positioned between the one of the first or the second strain-sensitive elements.

4. The strain sensor of claim 1, wherein the thermally conductive post extends between the first and second surfaces within the substrate.

5. The strain sensor of claim 1, wherein:
the thermally conductive post extends beyond both the first and second surfaces;
the thermally conductive plate is a first thermally conductive plate; and
the strain sensor further comprises a second thermally conductive plate separated from the substrate and attached to the thermally conductive plate opposite the first thermally conductive plate.

6. The strain sensor of claim 5, wherein:
the first strain-sensitive element is positioned between the substrate and the first thermally conductive plate; and
the second strain-sensitive element is positioned between the substrate and the second thermally conductive plate.

7. A strain sensor, comprising:
a substrate configured to deform in response to a force;
a pair of strain-sensitive elements disposed on the substrate and configured to produce an electrical response in response to deformation of the substrate;
a heat sink offset from the substrate and configured to receive heat induced in at least one of the pair of strain-sensitive elements; and
a thermally conductive post at least partially encompassed with the substrate.

8. The strain sensor of claim 7, wherein deformation of the substrate induces heat in at least one of the pair of strain-sensitive elements.

9. The strain sensor of claim 7, wherein the thermally conductive post is configured to maintain a substantially uniform temperature between the pair of strain-sensitive elements by transferring heat from one, or both, of the pair of strain-sensitive elements to the heat sink.

10. The strain sensor of claim 7, wherein the pair of strain-sensitive elements is vertically aligned on the substrate.

11. The strain sensor of claim 7, wherein:
the thermally conductive post is one of an array of thermally conductive posts; and
each of the array of thermally conductive posts contacts the heat sink and the substrate.

12. The strain sensor of claim 11, wherein:
the array of thermally conductive posts surrounds the pair of strain-sensitive elements.

13. The strain sensor of claim 7, wherein:
the heat sink is a planar structure positioned between the pair of strain-sensitive elements; and
the thermally conductive post contacts the planar structure.

14. A method of distributing heat in a strain sensor, comprising:
receiving a force input at an input surface and heating a first region of the strain sensor, positioned below the input surface, defined by a first strain-sensitive element;
transferring energy, through a thermally conductive post, between the first region and a second region of the strain sensor defined by a second strain-sensitive element; and
storing energy at a thermal shield coupled to the thermally conductive post, wherein:
the thermal shield is spaced apart from at least one of the first and second strain-sensitive elements.

15. The method of claim 14, further comprising:
maintaining the first and second regions at a substantially uniform temperature using the thermally conductive post and the thermal shield.

16. The method of claim 14, wherein the transferring energy comprises:
using heat from the first region to heat the second region.

17. The method of claim 14, wherein:
the first and second strain-sensitive elements are two of a group of strain-sensitive elements positioned on the strain sensor;
the thermally conductive post is one of an array of thermally conductive posts positioned within the strain sensor; and
the transferring energy comprises distributing heat substantially uniformly across the group of strain-sensitive elements using the array of thermally conductive posts.

18. The method of claim 14, wherein the first and second strain-sensitive elements are positioned on opposing surfaces of the strain sensor, thereby defining a gap between the at least one of the first and second strain-sensitive elements and the thermal shield.

19. The strain sensor of claim 1, wherein:
the substrate is configured for attachment along an interior surface of an electronic device;
the electronic device comprises a touch sensitive display configured to receive an input; and
the thermally conductive post and the thermally conductive plate are configured to distribute heat within the strain sensor induced by the input.

20. The strain sensor of claim 19, wherein:
the electronic device comprises an enclosure having a first opening and a second opening defined along a top surface;
the touch sensitive display is at least partially positioned within the first opening;
the electronic device further comprises an input member at least partially positioned within the second opening; and
the touch sensitive display is configured to depict a graphical output responsive to the input received at touch sensitive display and an input received at the input member.

* * * * *